United States Patent
Ohara et al.

(10) Patent No.: US 10,960,642 B2
(45) Date of Patent: Mar. 30, 2021

(54) SOLVENT-FREE-ADHESIVE POLYISOCYANATE COMPOSITION, SOLVENT-FREE ADHESIVE, AND METHOD FOR PRODUCING MULTILAYER FILM USING THE SAME

(71) Applicant: DIC Corporation, Tokyo (JP)

(72) Inventors: Shinichi Ohara, Tokyo (JP); Kiyokazu Umetsu, Tokyo (JP); Ryoji Kimura, Tokyo (JP); Tomoo Okubo, Tokyo (JP); Kenichi Shimamura, Tokyo (JP); Kohei Nakane, Tokyo (JP)

(73) Assignee: DIC Corporation, Tokyo (JP)

( * ) Notice: Subject to any disclaimer, the term of this patent is extended or adjusted under 35 U.S.C. 154(b) by 0 days.

(21) Appl. No.: 15/903,825

(22) Filed: Feb. 23, 2018

(65) Prior Publication Data

US 2019/0169475 A1  Jun. 6, 2019

Related U.S. Application Data

(63) Continuation of application No. PCT/JP2016/084560, filed on Nov. 22, 2016.

(30) Foreign Application Priority Data

Nov. 26, 2015  (JP) .............. JP2015-230624

(51) Int. Cl.
| | | |
|---|---|---|
| *C09J 175/04* | (2006.01) | |
| *B32B 7/12* | (2006.01) | |
| *B32B 9/00* | (2006.01) | |
| *B32B 15/20* | (2006.01) | |
| *C08G 18/62* | (2006.01) | |
| *C08G 18/76* | (2006.01) | |
| *C08G 18/42* | (2006.01) | |
| *C08G 18/40* | (2006.01) | |
| *C09J 125/02* | (2006.01) | |
| *C09J 135/06* | (2006.01) | |
| *B32B 27/40* | (2006.01) | |
| *B32B 15/095* | (2006.01) | |

(52) U.S. Cl.
CPC .............. *B32B 7/12* (2013.01); *B32B 9/005* (2013.01); *B32B 15/095* (2013.01); *B32B 15/20* (2013.01); *B32B 27/40* (2013.01); *C09J 125/02* (2013.01); *C09J 135/06* (2013.01); *C09J 175/04* (2013.01); *B32B 2553/00* (2013.01)

(58) Field of Classification Search
None
See application file for complete search history.

(56) References Cited

U.S. PATENT DOCUMENTS

| | | | |
|---|---|---|---|
| 5,376,490 A | | 12/1994 | Sasaki et al. |
| 2003/0181589 A1* | | 9/2003 | Brinkman .............. C08G 18/10 525/131 |
| 2013/0158186 A1* | | 6/2013 | Takeda .................... B32B 27/36 524/539 |
| 2016/0234934 A1* | | 8/2016 | Higashida ................. C08J 5/24 |

FOREIGN PATENT DOCUMENTS

| | | |
|---|---|---|
| CN | 103937192 A | 7/2014 |
| JP | 2015-117328 A | 6/2015 |

OTHER PUBLICATIONS

Cray Valley, Technical Data Sheet of SMA® 2000 (Mar. 2016) (Year: 2016).*
Extended European Search Report issued in European Application No. 16868535.2, dated Apr. 2, 2019 (6 pages).

* cited by examiner

*Primary Examiner* — Cheng Yuan Huang
(74) *Attorney, Agent, or Firm* — Osha Bergman Watanabe & Burton LLP

(57) ABSTRACT

Provided is a solvent-free-adhesive polyisocyanate composition, containing, a polyisocyanate (A) and an aromatic vinyl-maleic anhydride copolymer (B), which is a copolymer of aromatic vinyl and maleic anhydride in which a molar ratio [aromatic vinyl/maleic anhydride] of the raw material monomers of the copolymer is 1.5/1 to 5/1. Further provided is a method for producing the polyisocyanate composition; a solvent-free adhesive containing, the solvent-free-adhesive polyisocyanate composition and a polyol (Y); and a multilayer film obtained by laminating a first base material film, a second base material film, and an adhesive layer between the base material films, in which the adhesive layer is formed of the solvent-free adhesive.

6 Claims, No Drawings

SOLVENT-FREE-ADHESIVE POLYISOCYANATE COMPOSITION, SOLVENT-FREE ADHESIVE, AND METHOD FOR PRODUCING MULTILAYER FILM USING THE SAME

TECHNICAL FIELD

One or more embodiments of the present invention relate to a solvent-free adhesive, a polyisocyanate composition for use therein, and a multilayer film prepared by laminating various films by using the adhesive. One or more embodiments of the present invention relate to an adhesive for lamination, used to laminate various plastic films, metal-deposited films, aluminum foils, etc., so as to produce composite films mainly used in packaging materials for food, pharmaceutical products, detergents, etc.

BACKGROUND

Polyurethane resins are widely used as laminate adhesives for soft packaging materials due to their excellent adhesion to the base material and excellent flexibility. Laminate films bonded by the urethane resin adhesives are used as packaging materials for food, pharmaceutical products, detergents, etc.

The mainstream method heretofore has been a dry lamination method in which an adhesive dissolved in an organic solvent is applied to a film, the organic solvent is evaporated as the film passes through an oven, and another film is bonded thereto. However, recent years have seen an increase in demand for two-component-type solvent-free laminate adhesives that do not contain organic solvents from the viewpoints of reducing impact on the environment and improving the work environment (refer to PTL 1 below).

In these solvent-free laminate adhesives, the resin component inevitably has a low molecular weight to obtain an appropriate coating property, and thus, the adhesion strength of the product laminate, in other words, the laminate strength, is low, which raises issues such as insufficient resistance to high-temperature retort treatment and insufficient adhesion to aluminum base materials or aluminum-deposited base materials in a high-temperature environment. Meanwhile, increasing the molecular weight and improving the laminate adhesion strength may result in insufficient pot life.

Then, in order to resolve the technical trade-off between the laminate strength and the pot life of such solvent-free laminate adhesives, PTL 1 below discloses a two-component solvent-free adhesive composed of a polyol component and a polyisocyanate component, in which a polyol premix is prepared by adding a styrene-maleic anhydride copolymer and propylene carbonate to the polyol component and is combined with the polyisocyanate component.

However, with this technology, when the polyol premix prepared by adding a styrene-maleic anhydride copolymer and propylene carbonate to the polyol component is stored for a long time, the styrene-maleic anhydride copolymer reacts with the polyol, ring-opening of the acid anhydride groups leads to generation of carboxyl groups, and a significant increase in viscosity occurs when the premix is mixed with the polyisocyanate component, thereby failing to obtain an appropriate working time (pot life). This phenomenon has been particularly significant when the premix is stored at high temperature (for example, at 60° C. for about 10 days).

Moreover, regarding the adhesion strength, the strength and the adhesion to the aluminum base material after a high-temperature retort treatment have not been sufficient; in addition, the adhesive function is no longer exhibited when the long-term storage of the adhesive causes an increase in viscosity. Furthermore, propylene carbonate, which is a blended component, has a low molecular weight, and thus when the composition is used in food pouches, there is a risk of elution of propylene carbonate into the content.

CITATION LIST

Patent Literature

[PTL 1] Japanese Unexamined Patent Application Publication No. 2015-117328

SUMMARY

One or more embodiments of the present invention provide a solvent-free adhesive that exhibits excellent laminate strength while maintaining the working time (pot life) and that can maintain the working time (pot life) and the laminate strength even after the adhesive and raw materials thereof, namely, a polyisocyanate and a polyol, are stored for a long time, and to provide a polyisocyanate composition to be used in the solvent-free adhesive, and a multilayer film obtained by laminating base material films by using the adhesive.

One or more embodiments of the present invention provide that when a mixture containing a polyisocyanate composition (X) and an aromatic vinyl-maleic anhydride copolymer (B), in which the molar ratio [aromatic vinyl/maleic anhydride] of aromatic vinyl to maleic anhydride is 1.5/1 to 5/1, is used as the polyisocyanate component of a polyisocyanate/polyol curing-type solvent-free adhesive, the laminate strength is improved while ensuring an appropriate pot life. Moreover, even when the adhesive is used after long-term storage, in particular, storage under high-temperature conditions, the pot life performance and excellent laminate strength can both be achieved.

In other words, one or more embodiments of the present invention provide a solvent-free-adhesive polyisocyanate composition containing, as essential components, a polyisocyanate (A) and an aromatic vinyl-maleic anhydride copolymer (B), which is a copolymer of aromatic vinyl and maleic anhydride and in which a molar ratio [aromatic vinyl/maleic anhydride] of raw material monomers of the copolymer is 1.5/1 to 5/1.

One or more embodiments of the present invention also provide a method for producing a solvent-free-adhesive polyisocyanate composition by reacting polyisocyanate and a polyol component. The method includes conducting the reaction in the presence of an aromatic vinyl-maleic anhydride copolymer (B), which is a copolymer of aromatic vinyl and maleic anhydride and in which a molar ratio [aromatic vinyl/maleic anhydride] of raw material monomers of the copolymer is 1.5/1 to 5/1, wherein a mass ratio [polyisocyanate/aromatic vinyl-maleic anhydride copolymer (B)] of the polyisocyanate to the aromatic vinyl-maleic anhydride copolymer (B) is 100/0.1 to 100/6.

One or more embodiments of the present invention also provide a solvent-free adhesive that contains, as essential components, the solvent-free-adhesive polyisocyanate composition described above and a polyol (Y).

One or more embodiments of the present invention also provide a multilayer film obtained by laminating a first base material film, a second base material film, and an adhesive layer between the base material films, in which the adhesive layer is formed of the solvent-free adhesive described above.

One or more embodiments of the present invention also provide a package obtained by forming a bag from a multilayer film obtained by stacking a first base material film, a second base material film, and an adhesive layer between the base material films, in which the adhesive layer is formed of the solvent-free adhesive described above.

One or more embodiments of the present invention can provide a solvent-free adhesive that exhibits excellent laminate strength while maintaining the working time (pot life) and that can maintain the working time (pot life) and the laminate strength even after the adhesive is stored for a long time, a polyisocyanate composition to be used in the solvent-free adhesive, and a multilayer film obtained by laminating base material films by using the adhesive.

DETAILED DESCRIPTION OF EMBODIMENTS

Definition of Solvent-Free

An adhesive according to one or more embodiments of the present invention is an adhesive that cures as a result of chemical reaction of isocyanate groups and hydroxyl groups, and can be used as a solvent-free adhesive. For the purposes of one or more embodiments of the present invention, the "solvent" of the solvent-free adhesive means an organic solvent that has high dissolving power capable of dissolving the polyisocyanate (A) and the polyol used in one or more embodiments of the present invention, and "solvent-free" means that these organic solvents that have high dissolving power are not contained. Specific examples of the organic solvents having high dissolving power include toluene, xylene, methylene chloride, tetrahydrofuran, methanol, ethanol, isopropyl alcohol, methyl acetate, ethyl acetate, n-butyl acetate, acetone, methyl ethyl ketone (MEK), cyclohexanone, toluol, xylol, n-hexane, and cyclohexane. Among these, toluene, xylene, methylene chloride, tetrahydrofuran, methyl acetate, and ethyl acetate are known to be organic solvents that have particularly high dissolving power.

As described above, the solvent-free-adhesive polyisocyanate composition according to one or more embodiments of the present invention constitutes a polyisocyanate component, which is a main agent of a solvent-free adhesive of a polyisocyanate/polyol curing type, and is characterized by containing a polyisocyanate (A) and an aromatic vinyl-maleic acid copolymer (B), which is a copolymer of aromatic vinyl and maleic anhydride and in which a molar ratio [aromatic vinyl/maleic anhydride] of raw material monomers of the copolymer is 1.5/1 to 5/1. (Hereinafter, the solvent-free-adhesive polyisocyanate composition according to one or more embodiments of the present invention may be simply cited as "polyisocyanate composition (X)".)

Inherently, the aromatic vinyl-maleic anhydride copolymer (B) is sparingly soluble in the polyisocyanate component, and it is particularly difficult to make the copolymer (B) compatible with an isocyanate compound having an aromatic ring within the molecule; however, in one or more embodiments according to the present invention, the molar ratio [aromatic vinyl/maleic anhydride] of the monomers constituting the aromatic vinyl-maleic anhydride copolymer (B) is adjusted to be in the range of 1.5/1 to 5/1 so as to achieve good compatibility. In one or more embodiments of the present invention, the laminate strength can be dramatically improved by adding the copolymer having a monomer composition, in which the molar ratio [aromatic vinyl/maleic anhydride] is 1.5/1 to 5/1, to the polyisocyanate component. The molar ratio [aromatic vinyl/maleic anhydride] may be 1.5/1 to 3/1, or 1.5/1 to 2/1 since excellent laminate strength can be obtained.

Moreover, when 4,4'-diphenylmethane diisocyanate (MDI) is used as the polyisocyanate (A) and as a reactive diluent, aromatic amine (PAA) that has large impact on environment is readily generated; however, the aromatic vinyl-maleic anhydride copolymer (B) also has an effect of suppressing elution of PAA.

Examples of the polyisocyanate (A) used here include polyisocyanates having aromatic structures within molecular structures, such as tolylene diisocyanate, diphenylmethane diisocyanate, 1,5-naphthalene diisocyanate, triphenylmethane triisocyanate, and xylylene diisocyanate, and compounds obtained by modifying some of the NCO groups of these polyisocyanates with carbodiimide; alphanate compounds derived from these polyisocyanates; polyisocyanates having alicyclic structures within molecular structures, such as isophorone diisocyanate, 4,4'-methylenebis(cyclohexyl isocyanate), and 1,3-(isocyanatomethyl)cyclohexane; linear aliphatic polyisocyanates, such as 1,6-hexamethylene diisocyanate, lysine diisocyanate, and trimethylhexamethylene diisocyanate, and the alphanate compounds thereof; isocyanurates of these polyisocyanates; allophanates derived from these polyisocyanates; biurets derived from these polyisocyanates; adducts modified with trimethylolpropane; and polyisocyanates obtained as reaction products of various polyisocyanates described above and a polyol component.

In one or more embodiments, polyisocyanates obtained as reaction products of polyisocyanates having alicyclic structures or aromatic structures within molecular structures, polyisocyanates obtained as reaction products of a polyol component and carbodiimide-modified polyisocyanates having aromatic structures, polyisocyanates obtained as reaction products of a polyol component and alphanate compounds of linear aliphatic polyisocyanates, and polyisocyanates having alicyclic structures, aromatic structures, or nurate skeletons may be used from the viewpoint of excellent compatibility with the aromatic vinyl-maleic anhydride copolymer (B). In particular, polyisocyanates obtained as reaction products of the polyol component and polyisocyanates having alicyclic or aromatic structures within molecular structures and polyisocyanates having alicyclic structures, aromatic structures, or nurate skeletons may be used.

Among various polyisocyanates to be reacted with the polyol component, polyisocyanates having alicyclic structures or aromatic structures within their molecular structures may be used since the compatibility with the aromatic vinyl-maleic anhydride copolymer (B) is further improved. In particular, diphenylmethane diisocyanate, tolylene diisocyanate, xylylene diisocyanate, isophorone diisocyanate, and 4,4'-methylenebis(cyclohexyl isocyanate) may be used since adhesives with excellent laminate strength and curability is obtained while maintaining excellent compatibility.

In one or more embodiments of the present invention, the linear aliphatic polyisocyanate, together with a polyisocyanate having an aromatic structure within the molecular structure, may be reacted with the polyol component since flexibility can be imparted to the laminate product and the boil resistance can be enhanced. In this case, a linear aliphatic polyisocyanate can be introduced into the polyisocyanate (A) while forming urethane bonds or allophanate bonds as the polyisocyanate reacts with the hydroxyl groups in the polyol component. When the polyisocyanate, having an aromatic structure, and the linear aliphatic polyisocyanate are used in combination, the ratio of use in terms of mass [polyisocyanate having an aromatic structure/linear aliphatic polyisocyanate] may be 70/30 to 30/70 from the viewpoint of decreasing viscosity.

Regarding the reaction ratio of the polyisocyanate and the polyol component described above, the equivalent ratio [isocyanate group/hydroxyl group] of the isocyanate groups to the hydroxyl groups in the polyol component may be in the range of 1.5 to 5.0 since the viscosity of the adhesive falls within an appropriate range and the coating property is improved.

Specific examples of the polyol component to be reacted with the polyisocyanate having an alicyclic structure or aromatic structure within the molecular structure include linear aliphatic glycols such as ethylene glycol, propylene glycol, 1,3-propanediol, 1,4-butanediol, 1,5-pentanediol, 3-methyl-1,5-pentanediol, 1,6-hexanediol, neopentyl glycol, methylpentanediol, dimethylbutanediol, butylethylpropanediol, diethylene glycol, triethylene glycol, tetraethylene glycol, dipropylene glycol, tripropylene glycol, and bishydroxyethoxybenzene; alicyclic glycols such as 1,4-cyclohexanediol and 1,4-cyclohexanedimethanol; trifunctional or tetrafunctional aliphatic alcohols such as glycerin, trimethylolpropane, and pentaerythritol; bisphenols such as bisphenol A, bisphenol F, hydrogenated bisphenol A, and hydrogenated bisphenol F; dimer diols; polyether polyols obtained by addition-polymerizing an alkylene oxide, such as ethylene oxide, propylene oxide, butylene oxide, styrene oxide, epichlorohydrin, tetrahydrofuran, or cyclohexylene, in the presence of a polymerization initiator such as the glycol described above; a polyester polyol (1) obtained as a reaction product of the glycol or trifunctional or tetrafunctional aliphatic alcohol and a polyester obtained by ring-opening polymerization reaction of a cyclic ester compound such as propiolactone, butyrolactone, ε-caprolactone, σ-valerolactone, or β-methyl-σ-valerolactone; a polyester polyol (2) obtained by reacting a polycarboxylic acid and a difunctional polyol such as the linear aliphatic glycol, alicyclic glycol, dimer diol, or bisphenol; a polyester polyol (3) obtained by reacting the trifunctional or tetrafunctional aliphatic alcohol and a polycarboxylic acid; a polyester polyol (4) obtained by reacting a difunctional polyol, the trifunctional or tetrafunctional aliphatic alcohol, and a polycarboxylic acid; a polyester polyol (5), which is a polymer of a hydroxyl acid such as dimethylol propionic acid or castor oil fatty acid; and a mixture of a polyether polyol and the polyester polyol (1), (2), (3), (4), or (5) described above.

Here, examples of the polycarboxylic acids used in producing the polyester polyols (2), (3), and (4) include acyclic aliphatic dicarboxylic acids such as succinic acid, adipic acid, azelaic acid, sebacic acid, dodecanedicarboxylic acid, maleic anhydride, and fumaric acid; alicyclic dicarboxylic acids such as 1,3-cyclopentanedicarboxylic acid and 1,4-cyclohexanedicarboxylic acid; aromatic dicarboxylic acids such as terephthalic acid, isophthalic acid, phthalic acid, 1,4-naphthalenedicarboxylic acid, 2,5-naphthalenedicarboxylic acid, 2,6-naphthalenedicarboxylic acid, naphthalic acid, biphenyldicarboxylic acid, and 1,2-bis(phenoxy)ethane-p,p'-dicarboxylic acid; anhydrides or ester-forming derivatives of these aliphatic or aromatic dicarboxylic acids; and polybasic acids such as p-hydroxybenzoic acid, p-(2-hydroxyethoxy)benzoic acid, and ester-forming derivatives, dimer acids, etc., of these dihydroxycarboxylic acids.

Among these polyol components, the polyether polyols and the polyester polyols (1) to (5) may be selected from the viewpoint of the retorting resistance of the adhesives prepared therefrom.

Among these, polyether polyols may be used as they can improve the flexibility of the laminate product and can enhance boiling resistance, and polypropylene glycol may be used for excellent heat resistance.

Among the polyester polyols (1) to (5), from the viewpoint of decreasing the viscosity, polyester polyols (2) may be aliphatic polyester polyols each obtained as a reaction product of a linear aliphatic glycol and an acyclic aliphatic dicarboxylic acid, and polyester polyols (4) additionally may be branched-structure-containing aliphatic polyester polyols each obtained as a reaction product of a linear aliphatic glycol, a trifunctional or tetrafunctional aliphatic alcohol, and an acyclic aliphatic dicarboxylic acid.

Meanwhile, among the polyester polyols (1) to (5), from the viewpoint of the laminate strength, polyester polyols obtained by using, as the raw material alcohol, trifunctional or tetrafunctional aliphatic alcohols of the polyester polyols (3) or (4) may be used.

Here, in isocyanating the polyester polyols (1) to (5), these polyester polyols (1) and (5) may be substituted with polyether polyols from the viewpoints of maintaining excellent laminate strength and further decreasing the viscosity of the solvent-free-adhesive polyisocyanate composition. In this case, the weight-average molecular weight (Mw) of the polyether polyol may be in the range of 400 to 2000, and the blend ratio of the polyester polyols (1) to (5) to the polyether polyol may be set so that the mass ratio (polyester polyol component [(1) to (5) above]/polyether polyol) is in the range of 99/1 to 70/30 from the viewpoint of the compatibility between the two polyisocyanates.

Here, in one or more embodiments, as discussed above, the elution amount of aromatic-containing amines, such as PAA and XDA, can be effectively decreased even when polyether polyurethane polyisocyanate and polyester polyurethane polyisocyanate obtained by using, as starting materials, polyisocyanates having aromatic structures within their molecular structure. Moreover, it is worth mentioning that the compatibility with the aromatic vinyl-maleic anhydride copolymer (B) is improved.

The polyisocyanate (A) described above may have a weight-average molecular weight (Mw) in the range of 3,000 to 10,000 from the viewpoints of decreasing the aging time and obtaining an appropriate pot life. The polyester polyurethane polyisocyanates based on the polyester polyols (1) to (5) may have an isocyanate content of 8% to 20% by mass determined by titration (using di-n-butylamine), as the resin viscosity becomes appropriate and the coating property is improved.

The polyisocyanate composition (X) of one or more embodiments of the present invention contains, as essential components, the polyisocyanate (A) and the aromatic vinyl-maleic anhydride copolymer (B), and the aromatic vinyl-maleic anhydride copolymer (B) used herein is obtained by reacting aromatic vinyl and maleic anhydride at a molar ratio [aromatic vinyl/maleic anhydride] of 1.5/1 to 5/1. As described above, when a polyisocyanate premix is prepared by preliminarily adding the copolymer (B) to the polyisocyanate (A), the compatibility with the polyisocyanate (A), in particular, compatibility with the polyisocyanate (A) having an aromatic component, is dramatically improved, and, it is no longer necessary to use, for example, a highly toxic propylene carbonate as a compatibilizer.

Specific examples of the aromatic vinyl constituting the aromatic vinyl-maleic anhydride copolymer (B) include styrene, α-methylstyrene, and divinylbenzene, and, among these, styrene may be selected for its excellent compatibility with the polyisocyanate (A). The aromatic vinyl and the maleic anhydride can be copolymerized by radical polymerization, and the weight-average molecular weight (Mw) thereof may be in the range of 5,000 to 15,000.

The solvent-free-adhesive polyisocyanate composition (X) described in detail above can be produced by mixing the polyisocyanate (A) and the aromatic vinyl-maleic anhydride copolymer (B), but, may be produced by reacting a polyisocyanate compound and a polyol component in the presence of the aromatic vinyl-maleic anhydride copolymer (B) from the viewpoint of improving the compatibility between the aromatic vinyl-maleic anhydride copolymer (B) and the polyisocyanate (A) obtained.

Here, the blend ratio of the polyisocyanate (A) to the aromatic vinyl-maleic anhydride copolymer (B) may be set so that the mass ratio [(A)/(B)] is 100/0.1 to 100/6 from the viewpoint of adhesion to aluminum after retort treatment.

An example of the method for conducting the reaction of the polyisocyanate compound and the polyol component in the presence of the aromatic vinyl-maleic anhydride copolymer (B) involves charging a polyisocyanate compound and the aromatic vinyl-maleic anhydride copolymer (B) into a reactor at a mass ratio [(A)/(B)] of 100/0.1 to 100/6 and conducting a reaction under a nitrogen gas stream and stirring at a temperature condition of 40 to 100° C. Here, the reaction time may be enough for the isocyanate percentage in the system to reach the range of 8.0 to 18.0% by mass.

Examples of the polyol (Y) that may be used in one or more embodiments of the present invention include glycols such as ethylene glycol, propylene glycol, 1,3-propanediol, 1,4-butanediol, 1,5-pentanediol, 3-methyl-1,5-pentanediol, 1,6-hexanediol, neopentyl glycol, methylpentanediol, dimethylbutanediol, butylethylpropanediol, diethylene glycol, triethylene glycol, tetraethylene glycol, dipropylene glycol, tripropylene glycol, bishydroxyethoxybenzene, 1,4-cyclohexanediol, 1,4-cyclohexanedimethanol, and triethylene glycol;
trifunctional or tetrafunctional aliphatic alcohols such as glycerin, trimethylolpropane, and pentaerythritol; bisphenols such as bisphenol A, bisphenol F, hydrogenated bisphenol A, and hydrogenated bisphenol F;
dimer diols; polyether polyols prepared by addition-polymerizing an alkylene oxide, such as ethylene oxide, propylene oxide, butylene oxide, styrene oxide, epichlorohydrin, tetrahydrofuran, or cyclohexylene, in the presence of a polymerization initiator such as the glycol; urethane-bond-containing polyether polyols in which the molecular weight of the polyether polyol is further increased by the aromatic or aliphatic polyisocyanate; polyester polyols (1) each obtained as a reaction product of a polyester, which is obtained by ring-opening polymerization reaction of a cyclic ester compound, such as propiolactone, butyrolactone, ε-caprolactone, σ-valerolactone, or β-methyl-σ-valerolactone, and a polyhydric alcohol, such as the glycol, glycerin, trimethylol propane, or pentaerythritol;
polyester polyols (2) each obtained by reacting a difunctional polyol, such as the glycol, dimer diol, or the bisphenol, and a polycarboxylic acid:
polyester polyols (3) each obtained by reacting the trifunctional or tetrafunctional aliphatic alcohol and a polycarboxylic acid; polyester polyols (4) each obtained by reacting a difunctional polyol, the trifunctional or tetrafunctional aliphatic alcohol, and a polycarboxylic acid; polyester polyols (5), which are polymers of hydroxyl acids such as dimethylol propionic acid and castor oil fatty acid; urethane-bond-containing polyester polyether polyols obtained by the reaction of the polyester polyols (1) to (5), the polyether polyols, and aromatic or aliphatic polyisocyanates; polyester polyurethane polyols in which the molecular weight of the polyester polyols (1) to (5) is increased by aromatic or aliphatic polyisocyanates; and mixtures of polyester polyols (1) to (5) and polyether polyols.

Here, examples of the polycarboxylic acids include aliphatic dicarboxylic acids such as succinic acid, adipic acid, azelaic acid, sebacic acid, dodecanedicarboxylic acid, maleic anhydride, fumaric acid, 1,3-cyclopenane dicarboxylic acid, and 1,4-cyclohexane dicarboxylic acid; aromatic dicarboxylic acids such as terephthalic acid, isophthalic acid, 1,4-naphthalenedicarboxylic acid, 2,5-naphthalenedicarboxylic acid, 2,6-naphthalenedicarboxylic acid, naphthalic acid, biphenyldicarboxylic acid, and 1,2-bis(phenoxy) ethane-p,p'-dicarboxylic acid; anhydrides or ester-forming derivatives of these aliphatic or dicarboxylic acids; and polybasic acids such as p-hydroxybenzoic acid, p-(2-hydroxyethoxy)benzoic acid, and ester-forming derivatives, dimer acids, etc., of these dihydroxycarboxylic acids.

Among these, polyester polyols (3) and polyester polyols (4) may be selected for their excellent laminate strength after the retort treatment for use as pouch packaging bags. In particular, the one that used an aromatic dicarboxylic acid as a polycarboxylic acid raw material component may be used as the laminate strength after the retort treatment is further improved.

Here, the polyether polyols, the urethane-bond-containing polyether polyols, the polyester polyols (1) to (5), and the urethane-bond-containing polyester polyether polyols may have a hydroxyl value in the range of 50 to 300 mgKOH/g from the viewpoint of excellent wettability during coating.

The solvent-free adhesive of one or more embodiments of the present invention contains, as essential components, the solvent-free-adhesive polyisocyanate composition (X) described above and a polyol (Y). The blend ratio of the polyisocyanate composition and the polyol component (Y) may be set so that the equivalent ratio [isocyanate group/hydroxyl group] of the isocyanate groups in the polyisocyanate composition (X) and the hydroxyl groups in the polyol (Y) may be in the range of 1.0 to 5.0. In further regard to the adhesion strength and the heat resistance during heat sealing, the equivalent ratio may be in the range of 1.5 to 3.5 as these properties become notable.

When the solvent-free adhesive of one or more embodiments of the present invention contains, in addition to the polyisocyanate composition (X) and the polyol (Y), an alicyclic amide compound, which is either added to one of the polyisocyanate composition (X) and the polyol composition (Y) or added as a third component during coating, elution of toxic low-molecular-weight chemical substances, such as aromatic amines, into contents of the laminate packaged articles can be effectively suppressed.

Examples of the alicyclic amide compound used here include δ-valerolactam, ε-caprolactam, ω-enantholactam, η-capryllactam, and β-propiolactam. Among these, ε-caprolactam may be selected to decrease the elution amount of the low-molecular-weight chemical substances. As for the amount blended, 0.1 to 5 parts by mass of the alicyclic amide compound may be blended per 100 parts by mass of the polyol (Y).

The solvent-free adhesive of one or more embodiments of the present invention may also contain a pigment, as needed. The pigment that can be used in such a case may not be particularly limited, and examples thereof include organic pigments and inorganic pigments such as extender pigments, white pigments, black pigments, gray pigments, red pigments, brown pigments, green pigments, blue pigments, metal powder pigments, light-emitting pigments, and pearl-colored pigments, and plastic pigments described in Toryo Genryou Binran (Paint material handbook), 1970 edition (edited by Japan Paint Manufacturers Association). Specific examples of these coloring agents vary. Examples of the organic pigments include various insoluble azo pigments such as benzidine yellow, hansa yellow, and lake red 4R; soluble azo pigments such as lake red C, carmine 6B, and Bordeaux 10; various (copper) phthalocyanine pigments such as phthalocyanine blue and phthalocyanine green; various chlorine dyed lakes such as rhodamine lake and methyl violet lake; various mordant dye pigments such as quinoline lake and fast sky blue; various vat dye pigments such as anthraquinone pigments, thioindigo pigments, and perinone pigments; various quinacridone pigments such as cinquasia red B; various dioxazine pigments such as dioxazine violet; various condensed azo pigments such as chromophthal; and aniline black.

Examples of the inorganic pigments may include various chromates such as chrome yellow, zinc chromate, and molybdate orange; ferrocyan compounds such as Prussian blue; various metal oxides such as titanium oxide, Chinese flower, Mapico yellow, iron oxide, red iron oxide, chromium oxide green, and zirconium oxide; various sulfides and selenides such as cadmium yellow, cadmium red, and mercury sulfide; various sulfates such as barium sulfate and lead sulfate; various silicates such as calcium silicate and ultramarine blue; various carbonates such as calcium carbonate and magnesium carbonate; various phosphates such as cobalt violet and manganese violet; various metal powder pigments such as aluminum powder, gold powder, silver powder, copper powder, bronze powder, and brass powder; flake pigments of these metals and mica flake pigments; metallic pigments and pearl pigments such as mica flake pigments coated with metal oxides and mica-like iron oxide pigments; and graphite and carbon black.

Examples of the extender pigment may include precipitated barium sulfate, chalk, precipitated calcium carbonate, calcium bicarbonate, white marble, alumina white, silica, hydrated fine powder silica (white carbon), ultrafine anhydrous silica (aerosil), silica sand, talc, precipitated magnesium carbonate, bentonite, clay, kaolin, and ocher.

Examples of the plastic pigments may include "GRANDOLL PP-1000" and "PP-2000S" produced by DIC Corporation.

Regarding the pigments used in one or more embodiments of the present invention, inorganic oxides such as titanium oxide and Chinese white may serve as white pigments, and carbon black may serve as a black pigment as they have excellent durability, weather resistance, and design properties.

The mass ratio of the pigments used in one or more embodiments of the present invention may be between 1 to 400 parts by mass or 10 to 300 parts by mass relative to a total of 100 parts by mass of the polyisocyanate composition (X) and the polyol (Y) since adhesion, blocking resistance, etc., are improved.

The solvent-free adhesive of one or more embodiments of the present invention may also use an adhesion promoter. Examples of the adhesion promoter include coupling agents such as a silane coupling agent, a titanate coupling agent, an aluminum coupling agent, and epoxy resins.

Examples of the silane coupling agent include amino silanes such as γ-aminopropyltriethoxysilane, γ-aminopropyltrimethoxysilane, N-β(aminoethyl)-γ-aminopropyltrimethoxysilane, N-β(aminoethyl)-γ-aminopropyltrimethyldimethoxysilane, and N-phenyl-γ-aminopropyltrimethoxysilane; epoxy silanes such as β-(3,4-epoxycyclohexyl)ethyltrimethoxysilane, γ-glycidoxypropyltrimethoxysilane, and γ-glycidoxypropyltriethoxysilane; vinyl silanes such as vinyltris(β-methoxyethoxy)silane, vinyltriethoxysilane, vinyltrimethoxysilane, and γ-methacryloxypropyltrimethoxysilane; and hexamethyldisilazane and γ-mercaptopropyltrimethoxysilane.

Examples of the titanate coupling agent may include tetraisopropoxytitanium, tetra-n-butoxytitanium, butyl titanate dimer, tetrastearyl titanate, titanium acetylacetonate, titanium lactate, tetraoctylene glycol titanate, titanium lactate, and tetrastearoxytitanium.

Examples of the aluminum coupling agent may include acetoalkoxy aluminum diisopropylate etc.

Examples of the epoxy resin may include various commercially available epoxy resins of epi-bis type, novolac type, β-methyl epichlo type, cyclic oxirane type, glycidyl ether type, glycidyl ester type, polyglycol ether type, glycol ether type, epoxidized fatty acid ester type, polycarboxylic acid ester type, aminoglycidyl type, and resorcine type.

If needed, the solvent-free adhesive of one or more embodiments of the present invention may also contain additives other than those described above. Examples of the additives may include a leveling agent; inorganic fine particles such as colloidal silica and alumina sol; organic fine particles based on polymethyl methacrylate; a defoaming agent; an antisagging agent; a wetting and dispersing agent; a viscosity adjustor; a UV absorber; a metal deactivating agent; a peroxide decomposer; a flame retardant; a reinforcing agent; a plasticizer; a lubricant; a rust inhibitor; a fluorescent brightener; an inorganic heat ray absorber; a flameproofing agent; an antistatic agent; and a dehydrating agent.

These pigments, adhesion promoters, and additives could be used by being either mixed with one of the polyisocyanate composition (X) and the polyol composition (Y) or added as a third component during coating.

The multilayer film of may be obtained by applying the solvent-free adhesive of one or more embodiments of the present invention described in detail above onto a first plastic film, stacking a second plastic film on the applied surface, and curing the adhesive layer.

A specific example is a method in which the solvent-free adhesive of one or more embodiments of the present invention may be applied by, for example, a roll coater coating method onto a first plastic film and then another base material is bonded thereto without conducting a drying step. The coating condition using a common roll coater may be about 500 to 2500 mPa·s while heating may be conducted to about 25° C. to 120° C. The coating amount may be 0.5 to 5 g/m² or about 1.5 to 4 g/m².

When the solvent-free adhesive of one or more embodiments of the present invention is used, the adhesive cures in 6 to 168 hours at room temperature or under heating after lamination, and practical physical properties are exhibited.

Typically, the adhesive curing temperature may be in the range of 15 to 60 degrees.

Examples of the first plastic film used here include base films such as a polyethylene terephthalate (PET) film, a nylon film, a biaxially stretched polypropylene (OPP) film, various deposited films such as a silica-deposited PET and alumina-deposited PET, and aluminum foils, and examples of the second base material include sealant films such as an unstretched polypropylene (CPP) film and a linear low-density polyethylene (LLDPE) film, and aluminum-deposited films of these films.

Typically, a laminate film may be obtained by bonding three or more types of films. Examples thereof include PET/aluminum/LLDPE, nylon/aluminum/LLDPE, PET/aluminum/CPP, nylon/aluminum/CPP, silica-deposited PET/nylon/LLDPE, alumina-deposited PET/nylon/CPP, and PET/nylon/PET/nylon/aluminum/CPP. In this case, examples of the first base material may include films such as a PET film and a nylon film, and examples of the second base material include an aluminum foil, and various deposited films such as aluminum-deposited PET, silica-deposited PET, and alumina-deposited PET.

The multilayer film obtained as such may be industrially used as a packaging material for packaging detergents and chemicals. Examples of the detergents and chemicals in specific usage may include laundry liquid detergents, kitchen liquid detergents, bath liquid detergents, bath liquid soaps, liquid shampoos, and liquid conditioners.

The packaging material produced by using the solvent-free adhesive of one or more embodiments of the present invention eliminates detachment, such as delamination, of the laminate structure and has excellent adhesion and content resistance when the content, such as a detergent and a chemical, is being filled and even after a passage of time after filling.

Typically, a soft packaging material that uses a laminate film may be formed into a bag of packaging material, and is filled with food. During this process, a step of thermally sterilizing the content includes conducting a spray treatment, boiling, or a retort treatment at normal pressure or a high pressure at 70 to 135° C. The packaging material produced by using the solvent-free adhesive eliminates detachment, such as delamination, of the laminate structure and has excellent adhesion and the content resistance even when these treatments are conducted.

EXAMPLES

The contents and effects of one or more embodiments of the present invention will now be described in further details by way of examples. The raw material polyols used as the raw materials in Examples and Comparative Examples are as follows.

Synthetic Example 1 [Synthesis of Polyester Polyol Resin Y1]

Into a reactor, 560 parts by mass of diethylene glycol was charged and heated to 80° C. while stirring in a nitrogen gas stream. Furthermore, 600 parts by mass of adipic acid was charged into the reactor under stirring and the resulting mixture was heated to 150° C. to 240° C. to conduct esterification reaction. When the acid value reached 5 mgKOH/g or less, the pressure in the reactor was slowly decreased, and reaction was conducted at 1 mmHg or less at 200 to 240° C. for 1 hour. As a result, a polyester polyol resin having hydroxyl groups at both terminals and having an acid value of 0.8 mgKOH/g and a molecular weight of about 840 (hereinafter this resin is simply referred to as the "polyester polyol resin Y1") was obtained.

Synthetic Example 2 [Synthesis of Polyester Polyol Resin Y2]

Into a reactor, 690 parts by mass of diethylene glycol and 8 parts by mass of trimethylol propane were charged and trimethylol propane was dissolved by being heated to 80° C. while stirring in a nitrogen gas stream. Furthermore, 810 parts by mass of adipic acid was charged into the reactor under stirring and the resulting mixture was heated to 150° C. to 240° C. to conduct esterification reaction. When the acid value reached 5 mgKOH/g or less, the pressure in the reactor was slowly decreased, and reaction was conducted at 1 mmHg or less at 200 to 220° C. for 1 hour. As a result, a polyester polyol resin having hydroxyl groups at both terminals and having an acid value of 0.8 mgKOH/g and a molecular weight of about 1270 (hereinafter this resin is simply referred to as the "polyester polyol resin Y2") was obtained.

Synthetic Example 3 [Synthesis of Polyester Polyol Resin Y3]

Into a reactor, 333 parts by mass of 2-methyl-propanediol, 179 parts by mass of diethylene glycol, and 39 parts by mass of trimethylol propane were charged and trimethylol propane was dissolved by being heated to 80° C. while stirring in a nitrogen gas stream. Furthermore, 106 parts by mass of isophthalic acid and 610 parts by mass of adipic acid were charged into the reactor under stirring and the resulting mixture was heated to 150° C. to 240° C. to conduct esterification reaction. When the acid value reached 5 mgKOH/g or less, the pressure in the reactor was slowly decreased, and reaction was conducted at 1 mmHg or less at 200 to 240° C. for 1 hour. As a result, a polyester polyol resin having hydroxyl groups at both terminals and having an acid value of 0.5 mgKOH/g and a molecular weight of about 2100 (hereinafter this resin is simply referred to as the "polyester polyol resin Y3") was obtained.

Example 1 [Synthesis of Polyisocyanate Composition X1]

In a reactor, to 1100 parts by mass of the polyester polyol resin Y1 obtained in Synthetic Example 1, 250 parts by mass of 4,4'-diphenylmethane diisocyanate, 1000 parts by mass of an MDI mixture ["Lupranate MI" produced by BASF, a mixture with a 4,4'-diphenylmethane diisocyanate/2,4'-diphenylmethane diisocyanate (mass ratio) of 1/1, NCO group content: 33.3 g/100 g or more], and 47 parts by mass of a styrene-maleic anhydride copolymer ("SMA 2000" produced by Cray Valley, acid value: 355 mgKOH/g, weight-average molecular weight (Mw): 7500, hereinafter, this copolymer is simply referred to as "SMA-B1") obtained by reacting styrene and maleic anhydride at a reaction ratio [styrene/maleic anhydride] of 2/1 were charged, and the resulting mixture was reacted for about 10 hours under heating at 85° C. in a nitrogen gas stream while stirring. As a result, a composition containing SMA-B1 and a difunctional polyisocyanate having an isocyanate percentage of 13.0% by mass determined by titration (di-n-butylamine was used) was obtained.

This polyisocyanate composition containing 2% by mass of SMA-B1 is assumed to be the "polyisocyanate composition X1".

Example 2 [Synthesis of Polyisocyanate Composition X2]

In a reactor, to 1280 parts by mass of the polyester polyol resin Y2 obtained in Synthetic Example 2, 250 parts by mass of 4,4'-diphenylmethane diisocyanate, 1000 parts by mass of an MDI mixture ["Lupranate MI" produced by BASF, a mixture with a 4,4'-diphenylmethane diisocyanate/2,4'-diphenylmethane diisocyanate (mass ratio) of 1/1, NCO group content: g/100 g or more], and 51 parts by SMA-B1 were charged, and the resulting mixture was reacted for about 10 hours under heating at 85° C. in a nitrogen gas stream while stirring. As a result, a composition containing SMA-B1 and a difunctional polyisocyanate having an isocyanate percentage of 13.4% by mass determined by titration (di-n-butylamine was used) was obtained.

This polyisocyanate composition containing 2% by mass of SMA-B1 is assumed to be the "polyisocyanate composition X2".

Example 3 [Synthesis of Polyisocyanate Composition X3]

A composition containing SMA-B1 and a difunctional polyisocyanate was obtained as in Example 1 except that the amount of SMA-B1 used in Example 1 was changed to 2.35 parts by mass.

This polyisocyanate composition containing 0.1% by mass of SMA-B1 is assumed to be the "polyisocyanate composition X3".

Example 4 [Synthesis of Polyisocyanate Composition X4]

A composition containing SMA-B1 and a difunctional polyisocyanate was obtained as in Example 1 except that the amount of SMA-B1 used in Example 1 was changed to 117.5 parts by mass.

This polyisocyanate composition containing 5% by mass of SMA-B1 is assumed to be the "polyisocyanate composition X4".

Example 5 [Synthesis of Polyisocyanate Composition X5]

A composition containing SMA-B2 and a difunctional polyisocyanate was obtained as in Example 1 except that 47 parts by mass of SMA-B1 used in Example 1 was changed to 47 parts by mass of a styrene-maleic anhydride copolymer ("SMA 3000" produced by Cray Valley, acid value: 285 mgKOH/g, weight-average molecular weight (Mw): 9500, hereinafter this copolymer is simply referred to as "SMA-B2") obtained by reacting styrene and maleic anhydride at a reaction ratio [styrene/maleic anhydride] of 3/1.

This polyisocyanate composition containing 2% by mass of SMA-B2 is assumed to be the "polyisocyanate composition X5".

Example 6 [Synthesis of Polyisocyanate Composition X6]

A composition containing SMA-B3 and a difunctional polyisocyanate was obtained as in Example 1 except that 47 parts by mass of SMA-B1 used in Example 1 was changed to 47 parts by mass of a styrene-maleic anhydride copolymer ("SMA EF-40" produced by Cray Valley, acid value: 215 mgKOH/g, weight-average molecular weight (Mw): 10500, hereinafter this copolymer is simply referred to as "SMA-B3") obtained by reacting styrene and maleic anhydride at a reaction ratio [styrene/maleic anhydride] of 4/1.

This polyisocyanate composition containing 2% by mass of SMA-B3 is assumed to be the "polyisocyanate composition X6".

Example 7 [Synthesis of Polyisocyanate Composition X7]

In a reactor, to 1520 parts by mass of the polyester polyol resin Y1 obtained in Synthetic Example 1, 1000 parts by mass of toluene diisocyanate and 50 parts by mass of SMA-B1 were charged, and the resulting mixture was reacted for about 8 hours under heating at 85° C. in a nitrogen gas stream while stirring. As a result, a difunctional polyisocyanate composed of terminated toluene diisocyanate having an isocyanate percentage of 13.6% by mass was obtained. This polyisocyanate composition containing 2% by mass of this styrene/maleic anhydride=2/1 resin is assumed to be the "polyisocyanate X7".

Example 8 [Synthesis of Polyisocyanate Composition X8]

In a reactor, to 1370 parts by mass of the polyester polyol resin Y1 obtained in Synthetic Example 1, 1000 parts by mass of m-xylene diisocyanate and 47 parts by mass of SMA-B1 were charged, and the resulting mixture was reacted for about 10 hours under heating at 85° C. in a nitrogen gas stream while stirring. As a result, a difunctional polyisocyanate terminated and having an isocyanate percentage of 13.5% by mass was obtained. This polyisocyanate composition containing 2% by mass of SMA-B1 is assumed to be the polyisocyanate X8.

Example 9 [Synthesis of Polyisocyanate Composition X9]

In a reactor, to 1075 parts by mass of the polyester polyol resin Y1 obtained in Synthetic Example 1, 1000 parts by mass of isophorone diisocyanate and 42 parts by mass of SMA-B1 were charged, and the resulting mixture was reacted for about 12 hours under heating at 85° C. in a nitrogen gas stream while stirring. As a result, a difunctional polyisocyanate terminated and having an isocyanate percentage of 12.9% by mass was obtained. This polyisocyanate composition containing 2% by mass of SMA-B1 is assumed to be the polyisocyanate X9.

Example 10 [Synthesis of Polyisocyanate Composition X10]

In a reactor, to 820 parts by mass of the polyester polyol resin Y1 obtained in Synthetic Example 1, 1000 parts by mass of dicyclohexylmethane 4,4'-diisocyanate ("Vestanat H12MDI" produced by Evonik Industries AG) and 36 parts by mass of SMA-B1 were charged, and the resulting mixture was reacted for about 10 hours under heating at 85° C. in a nitrogen gas stream while stirring. As a result, a difunctional polyisocyanate terminated and having an isocyanate percentage of 12.8% by mass was obtained. This polyisocyanate composition containing 2% by mass of SMA-B1 is assumed to be the polyisocyanate composition X10.

Example 11 [Synthesis of Polyisocyanate Composition X11]

In a reactor, to 535 parts by mass of the polyester polyol resin Y1 obtained in Synthetic Example 1 and 535 parts by mass of polypropylene glycol having a weight-average molecular weight of 1000, 650 parts by mass of 4,4'-diphenylmethane diisocyanate, 650 parts by mass of carbodiimide-modified 4,4'-methylenebisphenyl diisocyanate ("Lupranate MM-103" produced by BASF), and 47 parts by mass of SMA-B1 were charged, and the resulting mixture was reacted for about 10 hours under heating at 85° C. in a nitrogen gas stream while stirring. As a result, a difunctional polyisocyanate having an isocyanate percentage of 13.3% by mass determined by titration (di-n-butylamine was used) was obtained. This polyisocyanate composition containing 2% by mass of SMA-B1 is assumed to be the polyisocyanate composition X11.

Example 12 [Synthesis of Polyisocyanate Composition X12]

In a reactor, to 1800 parts by mass of the polyester polyol resin Y1 obtained in Synthetic Example 1, 700 parts by mass of m-xylene diisocyanate, 1000 parts by mass of hexamethylene diisocyanate allophanate ("Basonat HA300" produced by BASF), and 70 parts by mass of SMA-B1 were charged, and the resulting mixture was reacted for about 10 hours under heating at 85° C. in a nitrogen gas stream while stirring. As a result, a difunctional polyisocyanate terminated and having an isocyanate percentage of 8.1% determined by titration (di-n-butylamine was used) was obtained. This polyisocyanate composition containing 2% by mass of SMA-B1 is assumed to be the polyisocyanate composition X12.

Example 13 [Synthesis of Polyisocyanate Composition X13]

In a reactor, to 1800 parts by mass of the polyester polyol resin Y1 obtained in Synthetic Example 1, 700 parts by mass of m-xylene diisocyanate, 1000 parts by mass of isophorone diisocyanate, and 70 parts by mass of SMA-B1 were charged, and the resulting mixture was reacted for about 10 hours under heating at 85° C. in a nitrogen gas stream while stirring. As a result, a difunctional polyisocyanate terminated and having an isocyanate percentage of 9.0% determined by titration (di-n-butylamine was used) was obtained. Subsequently, 170 parts of isocyanurate of isophorone diisocyanate was dissolved at 100° C. This polyisocyanate composition containing 2% by mass of SMA-B1 is assumed to be the polyisocyanate composition X13.

Example 14 [Synthesis of Polyisocyanate Composition X14]

In a reactor, to 1190 parts by mass of hexanemethylene diisocyanurate (Desmodur N3300 produced by Sumitomo Covestro Japan), 790 of isocyanurate of isophorone diisocyanate and 20 parts by mass of SMA-B1 were charged, and the resulting mixture was heated and dissolved at 85° C. in a nitrogen gas stream while stirring. This polyisocyanate composition composed of trifunctional polyisocyanurate and containing 2% by mass of SMA-B1 is assumed to be the polyisocyanate composition X13.

Comparative Example 1 [Preparation of Polyester Polyol Composition Y']

To 1000 parts by mass of the polyester polyol resin Y3 obtained in Synthetic Example 3, 20 parts by mass of a styrene-maleic anhydride copolymer ("SMA 1000" produced by Cray Valley, acid value: 480 mgKOH/g, weight-average molecular weight (Mw): 5500, hereinafter this copolymer is simply referred to as "SMA-B4") obtained by reacting styrene and maleic anhydride at a reaction ratio [styrene/maleic anhydride] of 1/1 was added, and the resulting mixture was stirred for 2 hours to dissolve SMA-B4. This resin containing 2% by mass of SMA-B4 is assumed to be a polyester polyol composition Y'.

Comparative Example 2 [Synthesis of Polyisocyanate Resin Hx1]

In a reactor, to 1100 parts by mass of the polyester polyol resin Y1 obtained in Synthetic Example 1, 250 parts by mass of 4,4'-methylenebisdiphenylisocyanate and 1000 parts by mass of an MDI mixture ["Lupranate MI" produced by BASF, a mixture with a 4,4'-diphenylmethane diisocyanate/2,4'-diphenylmethane diisocyanate (mass ratio) of 1/1, NCO group content: g/100 g or more] were charged, and the resulting mixture was reacted for about 10 hours under heating at 85° C. in a nitrogen gas stream while stirring. As a result, a difunctional polyisocyanate having an isocyanate percentage of 13.2% by mass determined by titration (di-n-butylamine was used) was obtained. This resin not containing a styrene/maleic anhydride resin is assumed to be the polyisocyanate resin Hx1.

Comparative Example 3 [Synthesis of Polyisocyanate Composition Hx2]

A composition containing SMA-B4 and a difunctional polyisocyanate was obtained as in Example 1 except that 47 parts by mass of SMA-B1 used in Example 1 was changed to 47 parts by mass of SMA-B4.

This polyisocyanate composition containing 2% by mass of SMA-B4 is assumed to be the "polyisocyanate composition Hx2".

Comparative Example 4 [Synthesis of Polyisocyanate Composition Hx3]

A composition containing SMA-B3 and a difunctional polyisocyanate was obtained as in Example 1 except that 47 parts by mass of SMA-B1 used in Example 1 was changed to 47 parts by mass of a styrene-maleic anhydride copolymer ("SMA EF60" produced by Cray Valley, acid value: 156 mgKOH/g, weight-average molecular weight (Mw): 11500, hereinafter this copolymer is simply referred to as "SMA-B5") obtained by reacting styrene and maleic anhydride at a reaction ratio [styrene/maleic anhydride] of 6/1.

This polyisocyanate composition containing 2% by mass of SMA-B5 is assumed to be the "polyisocyanate composition Hx3".

Comparative Example 5 [Synthesis of Polyisocyanate Composition Hx4]

In a reactor, to 1190 parts by mass of hexanemethylene diisocyanurate (Desmodur N3300 produced by Sumitomo Covestro Japan), 790 parts of isocyanurate of isophorone diisocyanate was charged, and the resulting mixture was heated and dissolved at 85° C. in a nitrogen gas stream while stirring. This polyisocyanate composition composed of trifunctional polyisocyanurate is assumed to be the polyisocyanate composition Hx4.

Examples 15 to 31 and Comparative Examples 6 to 13

The following various types of evaluation were conducted by preparing adhesives according to the formulations in Tables 1-1, 1-2, and 2. The results are shown in Tables 1-1, 1-2, and 2.

(Method for Evaluating Laminate Strength)

After adhesives were prepared according to the formulations shown in Tables 1-1, 1-2, 1-3, and 2, each adhesive was applied to a PET film (15 um) on which a pattern was gravure-printed with a printing ink, UNIVURE NT (produced by DIC Corporation) so that the coating weight was about 2.0 g/m² on a solid basis, and a CPP film (75 um) was bonded to the coated surface of this film by using a laminator so as to prepare a laminate film. The laminate film was stored in a 40° C. thermostat for 3 days.

A sample having a width of 15 mm was taken from the laminate film, and the adhesion strength (N/15 mm) was measured by using a tensile tester by T-type peeling at a peeling rate of 300 mm/min.

The laminate strength may be high, and may be 4 N/15 mm or more, or 5 N/15 mm or more.

(Method for Evaluating Laminate Strength after Storing for a Particular Time)

The polyisocyanate compositions, the polyester polyol compositions, and the polyisocyanate resins of Synthetic Examples, Examples, and Comparative Examples described above were produced and then left to stand still for 10 days at 60° C.

The compositions and the resins after standing were used to prepare adhesives according to the formulations in Tables 1 and 2, and the laminate strength was measured in the same manner.

(Method for Evaluating Laminate Strength and Appearance after Retorting) Examples 15 to 28 and Comparative Examples 6 to 10

After adhesives were prepared, each adhesive was applied to a PET film on which a pattern was gravure-printed with a printing ink, UNIVURE NT (produced by DIC Corporation) so that the coating weight was about 2.0 g/m² on a solid basis, and an LLDPE film was bonded to the coated surface of this film by using a laminator so as to prepare a laminate film. The laminate film was stored in a 40° C. thermostat for 3 days. The laminate film was cut into 150 mm×300 mm, folded so that LLDP came on the inner side, and heat-sealed at 1 atm and 180° C. for 1 second so as to prepare a pouch. As the content, a 1/1/1 sauce (meat sauce:vegetable oil:vinegar=1:1:1) was added.

The filled pouch was subjected to steam sterilization treatment at 121° C. for 30 minutes, the content was removed, and the strength was measured by T-type peeling of the heat-sealed portions.

The appearance of the pouch after the content was removed was observed, and the following evaluation was made on the basis of absence or presence of delamination.
Grade A: No delamination
Grade B: Delamination was observed at five or less positions
Grade C: Delamination was observed at six or more positions
[Laminate Strength and Appearance after Retorting] Aluminum Structure After adhesives were prepared, each adhesive was applied to a PET film on which a pattern was gravure-printed with a printing ink ("UNIVURE NT" produced by DIC Corporation) so that the coating weight was about 2.0 g/m² on a solid basis, and an aluminum foil (15 um) was bonded to the coated surface of this film by using a laminator. The resulting laminate was stored in a 40° C. thermostat for 3 days. Subsequently, a CPP (75 um) was bonded to the aluminum surface of the laminate film so as to prepare a laminate film. The laminate film was stored in a 40° C. thermostat for 3 days.

The laminate film was cut into 150 mm×300 mm, folded so that CPP came on the inner side, and heat-sealed at 1 atm and 180° C. for 1 second so as to prepare a pouch. As the content, a 1/1/1 sauce (meat sauce:vegetable oil:vinegar=1:1:1) was added.

The filled pouch was subjected to steam sterilization treatment at 121° C. for 30 minutes, the content was removed, and the strength between aluminum and CPP was measured by T-type peeling.

The appearance of the pouch after the content was removed was observed, and the following evaluation was made on the basis of absence or presence of delamination.
[Laminate Strength and Appearance after Boiling Treatment] Vapor Deposition Configuration After adhesives were prepared, each adhesive was applied to vapor-deposited surface a vapor-deposited PET film on which a pattern was gravure-printed with a printing ink ("UNIVURE NT" produced by DIC Corporation) so that the coating weight was about 2.0 g/m² on a solid basis, and an LLDPE was bonded to the coated surface of this film by using a laminator so as to prepare a laminate film. The laminate film was stored in a 40° C. thermostat for 3 days.

The laminate film was cut into 150 mm×300 mm, folded so that LLDPE came on the inner side, and heat-sealed at 1 atm and 180° C. for 1 second so as to prepare a pouch. As the content, a 1/1/1 sauce (meat sauce:vegetable oil:vinegar=1:1:1) was added.

The filled pouch was subjected to boiling treatment at 98° C. for 60 minutes, the content was removed, and the strength between the vapor-deposited PET and LLDPE was measured by T-type peeling.

The appearance of the pouch after the content was removed was observed, and the following evaluation was made on the basis of absence or presence of delamination.

The vapor-deposited film used was an aluminum-deposited PET film, a silica-deposited PET film, or an alumina-deposited PET film.

(Method for Evaluating Laminate Strength and Appearance after Retorting after Storing for a Particular Time)

The polyisocyanate compositions, the polyester polyol compositions, and the polyisocyanate resins of Synthetic Examples, Examples, and Comparative Examples described above were produced and then left to stand still for 10 days at 60° C. The compositions and the resins after standing were used to prepare adhesives according to the formulations in Tables 1 and 2, and the laminate strength and appearance after retorting were evaluated in the same manner.

[Method for Evaluating Pot Life]

Immediately after each adhesive was prepared according to a formulation shown in Table 1-1, 1-2, or 2, about 0.8 g of the adhesive was placed on a measuring section of a rheometer, and measurement was conducted for 30 minutes at a temperature at which the viscosity immediately after preparation was about 1,000 mPa·s. The values of the viscosity at the start and after 30 minutes were used to conduct following evaluation.
Grade AA: The ratio of the viscosity after 30 minutes to the viscosity of the adhesive at the start was 1 or more and less than 2.
Grade A: The ratio of the viscosity after 30 minutes to the viscosity of the adhesive at the start was 2 or more and less than 3.

Grade B: The ratio of the viscosity after 30 minutes to the viscosity of the adhesive at the start was 3 or more and less than 4.

Grade C: The ratio of the viscosity after 30 minutes to the viscosity of the adhesive at the start was 4 or more.

(Method for Evaluating Pot Life after Storing for a Particular Time)

The polyisocyanate compositions, the polyester polyol compositions, and the polyisocyanate resins of Synthetic Examples, Examples, and Comparative Examples described above were produced and then left to stand still for 10 days at 60° C. The compositions and the resins after standing were used to prepare adhesives according to the formulations in Tables 1 and 2, and evaluation was conducted from the values of viscosity at the start and after 30 minutes according to the above-described standard.

[Evaluation of Amount of Toxic Components (PAA and XDA) Eluted]

After adhesives were prepared, each adhesive was applied to a PET film so that the coating weight was about 2.0 g/m$^2$ on a solid basis, and a CPP film was bonded to the coated surface of this film by using a laminator so as to prepare a laminate film. The laminate film was stored in a 40° C. thermostat for 3 days.

The laminate film after storing was cut into 120 mm×220 mm, folded so that CPP came on the inner side, and heat-sealed at three sides with a width of 10 mm at 1 atm and 180° C. for 1 second so as to prepare a pouch in which the content contacted the pouch by 2 dm$^2$. As the content, a 3% acetic acid vinegar solution was added. The filled pouch was stored at 70° C. for 2 hours, and PAA was measured by LC/MS/MS.

TABLE 1

Table 1-1 Without storing for a particular time

| | Evaluation results | Example 15 | Example 16 | Example 17 | Example 18 | Example 19 | Example 20 | Example 21 |
|---|---|---|---|---|---|---|---|---|
| Formulation | Polyester polyol resin Y3 | 50 | 50 | 50 | 50 | 50 | 50 | 50 |
| | Polyisocyanate composition X1 | 100 | | | | | | |
| | Polyisocyanate composition X2 | | 100 | | | | | |
| | Polyisocyanate composition X3 | | | 100 | | | | |
| | Polyisocyanate composition X4 | | | | 100 | | | |
| | Polyisocyanate composition X5 | | | | | 100 | | |
| | Polyisocyanate composition X6 | | | | | | 100 | |
| | Polyisocyanate composition X7 | | | | | | | 100 |
| | Polyisocyanate composition X8 | | | | | | | |
| | Polyisocyanate composition X9 | | | | | | | |
| | Polyisocyanate composition X10 | | | | | | | |
| | Polyisocyanate composition X11 | | | | | | | |
| | Polyisocyanate composition X12 | | | | | | | |
| | Polyisocyanate composition X13 | | | | | | | |
| | Polyisocyanate composition X14 | | | | | | | |
| Evaluation | Amount of PAA eluted | 10> | 10> | 10> | 10> | 10> | 10> | 10> |
| | Amount of XDA eluted | — | — | — | — | — | — | — |
| | Laminate strength | | | | | | | |
| | PET/LLDPE | 5.5 | 6.0 | 4.0 | 6.0 | 4.0 | 4.0 | 5.0 |
| | AL/CPP | 6.7 | 7.3 | 5.2 | 7.0 | 5.0 | 5.0 | 6.5 |
| | Al-deposited PET/LLDPE | | 1.4 | | | | | |
| | Silica-deposited PET/LLDPE | | 3.9 | | | | | |
| | Alumina-deposited PET/LLDPE | | 3.8 | | | | | |
| | Laminate strength after heat treatment | | | | | | | |
| | PET/LLDPE | 6.0 | 10.0 | 4.0 | 6.5 | 4.4 | 4.2 | 5.2 |
| | AL/CPP | 8.0 | 11.2 | 7.0 | 8.7 | 6.7 | 7.1 | 7.8 |
| | Al-deposited PET/LLDPE | | 1.5 | | | | | |
| | Silica-deposited PET/LLDPE | | 4.4 | | | | | |
| | Alumina-deposited PET/LLDPE | | 4.2 | | | | | |
| | Appearance after heat treatment | | | | | | | |
| | PET/LLDPE | A | A | A | A | A | A | A |
| | AL/CPP | A | A | A | A | A | A | A |
| | Al-deposited PET/LLDPE | | A | | | | | |
| | Silica-deposited PET/LLDPE | | A | | | | | |
| | Alumina-deposited PET/LLDPE | | A | | | | | |
| | Pot life | AA | A | AA | AA | A | A | A |

TABLE 2

Table 1-2 After storing for a particular time

| | Evaluation results | Example 15 | Example 16 | Example 17 | Example 18 | Example 19 | Example 20 | Example 21 |
|---|---|---|---|---|---|---|---|---|
| Formulation | Polyester polyol resin Y3 | 50 | 50 | 50 | 50 | 50 | 50 | 50 |
| | Polyisocyanate composition X1 | 100 | | | | | | |
| | Polyisocyanate composition X2 | | 100 | | | | | |
| | Polyisocyanate composition X3 | | | 100 | | | | |
| | Polyisocyanate composition X4 | | | | 100 | | | |
| | Polyisocyanate composition X5 | | | | | 100 | | |
| | Polyisocyanate composition X6 | | | | | | 100 | |

TABLE 2-continued

Table 1-2 After storing for a particular time

| | Evaluation results | Example 15 | Example 16 | Example 17 | Example 18 | Example 19 | Example 20 | Example 21 |
|---|---|---|---|---|---|---|---|---|
| Evaluation | Polyisocyanate composition X7 | | | | | | | 100 |
| | Polyisocyanate composition X8 | | | | | | | |
| | Polyisocyanate composition X9 | | | | | | | |
| | Polyisocyanate composition X10 | | | | | | | |
| | Polyisocyanate composition X11 | | | | | | | |
| | Polyisocyanate composition X12 | | | | | | | |
| | Polyisocyanate composition X13 | | | | | | | |
| | Polyisocyanate composition X14 | | | | | | | |
| | <Resin solution after storing for a particular time> Laminate strength | | | | | | | |
| | PET/LLDPE | 5.3 | 5.9 | 4.1 | 5.9 | 4.1 | 4.2 | 5.0 |
| | AL/CPP | 6.5 | 7.4 | 5.5 | 6.8 | 4.9 | 4.8 | 6.3 |
| | Al-deposited PET/LLDPE | | | 1.3 | | | | |
| | Silica-deposited PET/LLDPE | | | 3.7 | | | | |
| | Alumina-deposited PET/LLDPE | | | 3.8 | | | | |
| | Laminate strength after retorting | | | | | | | |
| | PET/LLDPE | 5.9 | 9.6 | 4.3 | 6.5 | 4.5 | 4.1 | 5.1 |
| | AL/CPP | 8.1 | 11.0 | 7.5 | 8.5 | 6.8 | 7.0 | 8.1 |
| | Al-deposited PET/LLDPE | | | 1.5 | | | | |
| | Silica-deposited PET/LLDPE | | | 4.1 | | | | |
| | Alumina-deposited PET/LLDPE | | | 3.9 | | | | |
| | Appearance after heat treatment | | | | | | | |
| | PET/LLDPE | A | A | A | A | A | A | A |
| | AL/CPP | A | A | A | A | A | A | A |
| | Al-deposited PET/LLDPE | | | A | | | | |
| | Silica-deposited PET/LLDPE | | | A | | | | |
| | Alumina-deposited PET/LLDPE | | | A | | | | |
| | Pot life | AA | A | AA | AA | A | A | A |

TABLE 3

Table 1-3 Without storing for a particular time

| | Evaluation results | Example 22 | Example 23 | Example 24 | Example 25 | Example 26 | Example 27 | Example 28 |
|---|---|---|---|---|---|---|---|---|
| Formulation | Polyester polyol resin Y3 | 50 | 50 | 50 | 50 | 50 | 50 | 50 |
| | Polyisocyanate composition X1 | | | | | | | |
| | Polyisocyanate composition X2 | | | | | | | |
| | Polyisocyanate composition X3 | | | | | | | |
| | Polyisocyanate composition X4 | | | | | | | |
| | Polyisocyanate composition X5 | | | | | | | |
| | Polyisocyanate composition X6 | | | | | | | |
| | Polyisocyanate composition X7 | | | | | | | |
| | Polyisocyanate composition X8 | 100 | | | | | | |
| | Polyisocyanate composition X9 | | 100 | | | | | |
| | Polyisocyanate composition X10 | | | 100 | | | | |
| | Polyisocyanate composition X11 | | | | 100 | | | |
| | Polyisocyanate composition X12 | | | | | 100 | | |
| | Polyisocyanate composition X13 | | | | | | 100 | |
| | Polyisocyanate composition X14 | | | | | | | 100 |
| Evaluation | Amount of PAA eluted | 10> | 10> | 10> | 10> | — | — | — |
| | Amount of XDA eluted | — | — | — | — | 5> | 5> | 6> |
| | Laminate strength | | | | | | | |
| | PET/LLDPE | 5.2 | 4.9 | 5.7 | 6.0 | 5.1 | 5.0 | 5.5 |
| | AL/CPP | 6.4 | 6.9 | 7.0 | 7.2 | 6.7 | 6.3 | 6.7 |
| | Al-deposited PET/LLDPE | | | | | | | |
| | Silica-deposited PET/LLDPE | | | | | | | |
| | Alumina-deposited PET/LLDPE | | | | | | | |
| | Laminate strength after heat treatment | | | | | | | |
| | PET/LLDPE | 5.4 | 5.0 | 6.2 | 6.5 | 6.0 | 6.3 | 6.3 |
| | AL/CPP | 6.9 | 7.4 | 8.0 | 7.8 | 7.2 | 7.4 | 7.5 |
| | Al-deposited PET/LLDPE | | | | | | | |
| | Silica-deposited PET/LLDPE | | | | | | | |
| | Alumina-deposited PET/LLDPE | | | | | | | |
| | Appearance after heat treatment | | | | | | | |
| | PET/LLDPE | A | A | A | A | A | A | A |
| | AL/CPP | A | A | A | A | A | A | A |

TABLE 3-continued

Table 1-3 Without storing for a particular time

| Evaluation results | Example 22 | Example 23 | Example 24 | Example 25 | Example 26 | Example 27 | Example 28 |
|---|---|---|---|---|---|---|---|
| Al-deposited PET/LLDPE | | | | | | | |
| Silica-deposited PET/LLDPE | | | | | | | |
| Alumina-deposited PET/LLDPE | | | | | | | |
| Pot life | A | A | A | A | AA | AA | AA |

TABLE 4

Table 1-4 After storing for a particular time

| | | Example 22 | Example 23 | Example 24 | Example 25 | Example 26 | Example 27 | Example 28 |
|---|---|---|---|---|---|---|---|---|
| | Evaluation results | | | | | | | |
| Formulation | Polyester polyol resin Y3 | 50 | 50 | 50 | 50 | 50 | 50 | 50 |
| | Polyisocyanate composition X1 | | | | | | | |
| | Polyisocyanate composition X2 | | | | | | | |
| | Polyisocyanate composition X3 | | | | | | | |
| | Polyisocyanate composition X4 | | | | | | | |
| | Polyisocyanate composition X5 | | | | | | | |
| | Polyisocyanate composition X6 | | | | | | | |
| | Polyisocyanate composition X7 | | | | | | | |
| | Polyisocyanate composition X8 | 100 | | | | | | |
| | Polyisocyanate composition X9 | | 100 | | | | | |
| | Polyisocyanate composition X10 | | | 100 | | | | |
| | Polyisocyanate composition X11 | | | | 100 | | | |
| | Polyisocyanate composition X12 | | | | | 100 | | |
| | Polyisocyanate composition X13 | | | | | | 100 | |
| | Polyisocyanate composition X14 | | | | | | | 100 |
| Evaluation | <Resin solution after storing for a particular time> Laminate strength | | | | | | | |
| | PET/LLDPE | 5.1 | 4.7 | 5.5 | 6.1 | 5.3 | 5.2 | 5.3 |
| | AL/CPP | 6.0 | 6.3 | 7.1 | 7.1 | 6.9 | 6.4 | 6.4 |
| | Al-deposited PET/LLDPE | | | | | | | |
| | Silica-deposited PET/LLDPE | | | | | | | |
| | Alumina-deposited PET/LLDPE | | | | | | | |
| | Laminate strength after heat treatment | | | | | | | |
| | PET/LLDPE | 5.2 | 5.1 | 6.1 | 6.2 | 6.2 | 5.9 | 6.0 |
| | AL/CPP | 6.8 | 7.4 | 7.7 | 7.7 | 6.9 | 7.3 | 7.4 |
| | Al-deposited PET/LLDPE | | | | | | | |
| | Silica-deposited PET/LLDPE | | | | | | | |
| | Alumina-deposited PET/LLDPE | | | | | | | |
| | Appearance after heat treatment | | | | | | | |
| | PET/LLDPE | A | A | A | A | A | A | A |
| | AL/CPP | A | A | A | A | A | A | A |
| | Al-deposited PET/LLDPE | | | | | | | |
| | Silica-deposited PET/LLDPE | | | | | | | |
| | Alumina-deposited PET/LLDPE | | | | | | | |
| | Pot life | A | A | A | A | AA | AA | AA |

TABLE 5

Table 2-1 Without storing for a particular time

| | Evaluation results | Comparative Example 6 | Comparative Example 7 | Comparative Example 8 | Comparative Example 9 | Comparative Example 10 |
|---|---|---|---|---|---|---|
| Formulation | Polyester polyol resin Y3 | | 50 | 50 | 50 | 50 |
| | Polyester polyol composition Y' | 50 | | | | |
| | Polyisocyanate resin Hx1 | 100 | 100 | | | |
| | Polyisocyanate composition Hx2 | | | 100 | | |
| | Polyisocyanate composition Hx3 | | | | 100 | |
| | Polyisocyanate composition Hx4 | | | | | 100 |
| Evaluation | Amount of PAA eluted | 10> | 30 | Precipitation occurred during preparation and evaluation could not carried out | — | |
| | Laminate strength | | | | | |
| | PET/LLDPE | 5.8 | 5.5 | | 4.0 | 3.2 |
| | AL/CPP | 7.0 | 6.9 | | 6.0 | 4.0 |
| | Al-deposited PET/LLDPE | | | | | |
| | Silica-deposited PET/LLDPE | | | | | |
| | Alumina-deposited PET/LLDPE | | | | | |

TABLE 5-continued

Table 2-1 Without storing for a particular time

| Evaluation results | | Comparative Example 6 | Comparative Example 7 | Comparative Example 8 | Comparative Example 9 | Comparative Example 10 |
|---|---|---|---|---|---|---|
| Laminate strength after heat treatment | | | | | | |
| | PET/LLDPE | 5.2 | 1.0 | | 1.2 | 1.0 |
| | AL/CPP | 10.4 | Delamination | | Delamination | Delamination |
| | Al-deposited PET/LLDPE | | Delamination | | | |
| | Silica-deposited PET/LLDPE | | Delamination | | | |
| | Alumina-deposited PET/LLDPE | | Delamination | | | |
| Appearance after heat treatment | | | | | | |
| | PET/LLDPE | A | A | | A | B |
| | AL/CPP | A | C | | C | C |
| | Al-deposited PET/LLDPE | | C | | | |
| | Silica-deposited PET/LLDPE | | C | | | |
| | Alumina-deposited PET/LLDPE | | C | | | |
| | Pot life | AA | AA | | AA | AA |

TABLE 6

Table 2-2 After storing for a particular time

| | Evaluation results | Comparative Example 6 | Comparative Example 7 | Comparative Example 8 | Comparative Example 9 | Comparative Example 10 |
|---|---|---|---|---|---|---|
| Formulation | Polyester polyol resin Y3 | | 50 | 50 | 50 | 50 |
| | Polyester polyol composition Y' | 50 | | | | |
| | Polyisocyanate resin Hx1 | 100 | 100 | | | |
| | Polyisocyanate composition Hx2 | | | 100 | | |
| | Polyisocyanate composition Hx3 | | | | 100 | |
| | Polyisocyanate composition Hx4 | | | | | 100 |
| Evaluation | <Resin solution after storing for a particular time> | | | Precipitation occurred during preparation and evaluation could not carried out | | |
| | Laminate strength | | | | | |
| | PET/LLDPE | 5.3 | 5.3 | | 3.7 | 3.7 |
| | AL/CPP | 3.0 | Delamination | | Delamination | Delamination |
| | Al-deposited PET/LLDPE | | Delamination | | | |
| | Silica-deposited PET/LLDPE | | Delamination | | | |
| | Alumina-deposited PET/LLDPE | | Delamination | | | |
| | Laminate strength after heat treatment | | | | | |
| | PET/LLDPE | 2.0 | 0.8 | | 0.9 | 0.8 |
| | AL/CPP | 1.3 | Delamination | | Delamination | Delamination |
| | Al-deposited PET/LLDPE | | Delamination | | | |
| | Silica-deposited PET/LLDPE | | Delamination | | | |
| | Alumina-deposited PET/LLDPE | | Delamination | | | |
| | Appearance after heat treatment | | | | | |
| | PET/LLDPE | A | A | | A | B |
| | AL/CPP | B | C | | C | C |
| | Al-deposited PET/LLDPE | | C | | | |
| | Silica-deposited PET/LLDPE | | C | | | |
| | Alumina-deposited PET/LLDPE | | C | | | |
| | Pot life | C | AA | | B | AA |

In the tables:

PAA denotes an aromatic amine;

XDA denotes xylene diisocyanate;

PET/LLDPE denotes polyethylene terephthalate/linear low-density polyethylene;

AL/CPP denotes aluminum/unstretched polypropylene; and

Al-deposited PET/LLDPE denotes aluminum-deposited polyethylene terephthalate/linear low-density polyethylene.

The results indicated that the adhesives of Examples had excellent laminate strength, laminate strength after heat treatment, and appearance both before and after storing the raw materials, namely, the polyisocyanate compositions, polyester polyol compositions, and polyisocyanate resins, for a particular time. In particular, the system that used "SMA-B1" as the styrene-maleic anhydride copolymer, the laminate strength was as high as 5 N/15 mm or more even after heat treatment. In contrast, the laminate strength of the adhesives of Comparative Examples after heat treatment was particularly low.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A solvent-free adhesive comprising a solvent-free-adhesive polyisocyanate composition, and a polyol (Y),
    wherein the solvent-free-adhesive polyisocyanate composition comprises a polyisocyanate (A) and an aromatic vinyl-maleic anhydride copolymer (B), the polyisocyanate (A) is a reaction product of a polyol component and a polyisocyanate comprising one or more selected from the group consisting of 4,4'-diphenylmethane diisocyanate, 2,4'-diphenylmethane diisocyanate, toluene diisocyanate, m-xylene diisocyanate, carbodiimide-modified 4,4'-methylenebisphenyl diisocyanate, hexamethylene diisocyanate allophanate, isophorone diisocyanate, hexanemethylene diisocyanurate, and isocyanurate of isophorone diisocyanate, the polyol (Y) is a polyester polyol, the copolymer is of an aromatic vinyl and a maleic anhydride, and the copolymer has a molar ratio [aromatic vinyl/maleic anhydride] of raw material monomers of 2/1 to 3/1, the aromatic vinyl-maleic anhydride copolymer (B) is a styrene-maleic anhydride copolymer, and the solvent-free adhesive polyisocyanate composition is essentially free of propylene carbonate.

2. A multilayer film obtained by laminating a first base material film, a second base material film, and an adhesive layer between the base material films, wherein the adhesive layer is formed of the solvent-free adhesive according to claim 1.

3. The multilayer film according to claim 2, wherein the base material films each comprise an aluminum, silica, or alumina layer, or are each a metal film.

4. A package obtained by forming a bag from a multilayer film obtained by laminating a first plastic film, a second plastic film, and an adhesive layer between the plastic films, wherein the adhesive layer is formed of the solvent-free adhesive according to claim 1.

5. The package according to claim 4, wherein the first plastic film and the second plastic film each comprise an aluminum, silica, or alumina layer, or are each a metal film.

6. A method for producing a solvent-free adhesive, the solvent-free adhesive comprising a solvent-free-adhesive polyisocyanate composition and a polyol (Y), the method comprising:

preparing a solvent-free-adhesive polyisocyanate composition comprising a polyisocyanate (A) and an aromatic vinyl-maleic anhydride copolymer (B); and mixing the solvent-free-adhesive polyisocyanate composition with the polyol (Y) component, wherein the polyisocyanate (A) is a reaction product of a polyol component and a polyisocyanate comprising one or more selected from the group consisting of 4,4'-diphenylmethane diisocyanate, 2,4'-diphenylmethane diisocyanate, toluene diisocyanate, m-xylene diisocyanate, carbodiimide-modified 4,4'-methylenebisphenyl diisocyanate, hexamethylene diisocyanate allophanate, isophorone diisocyanate, hexanemethylene diisocyanurate, and isocyanurate of isophorone diisocyanate, the polyol (Y) is a polyester polyol, the copolymer is of an aromatic vinyl and a maleic anhydride, and the copolymer has a molar ratio [aromatic vinyl/maleic anhydride] of raw material monomers of 2/1 to 3/1, the aromatic vinyl-maleic anhydride copolymer (B) is a styrene-maleic anhydride copolymer, and the solvent-free adhesive polyisocyanate composition is essentially free of propylene carbonate.

* * * * *